Aug. 30, 1932.  C. J. KRYZANOWSKY  1,875,024
APPARATUS FOR TREATING EXHAUST GASES OF INTERNAL COMBUSTION ENGINES
Filed Jan. 11, 1929    2 Sheets-Sheet 1
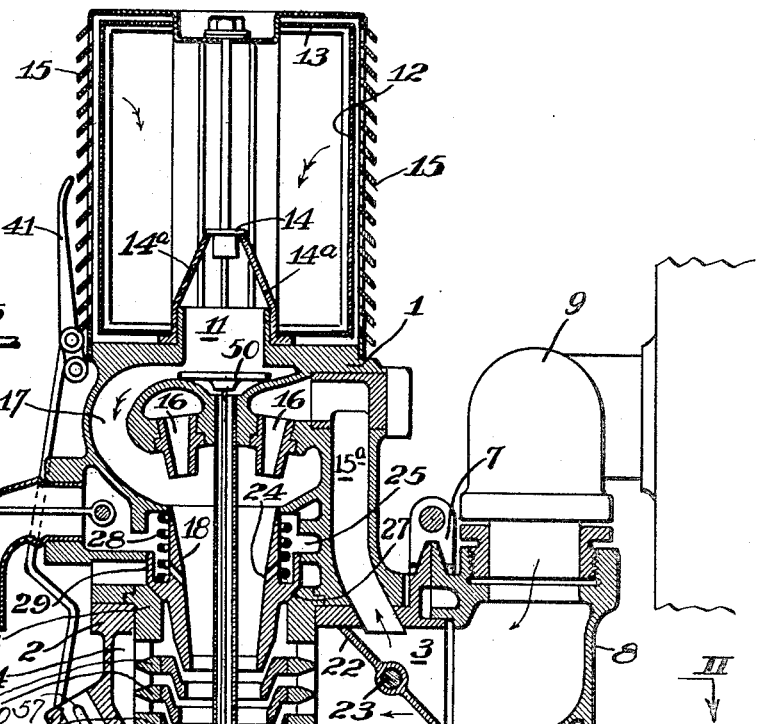

Aug. 30, 1932.     C. J. KRYZANOWSKY     1,875,024
APPARATUS FOR TREATING EXHAUST GASES OF INTERNAL COMBUSTION ENGINES
Filed Jan. 11, 1929     2 Sheets-Sheet 2
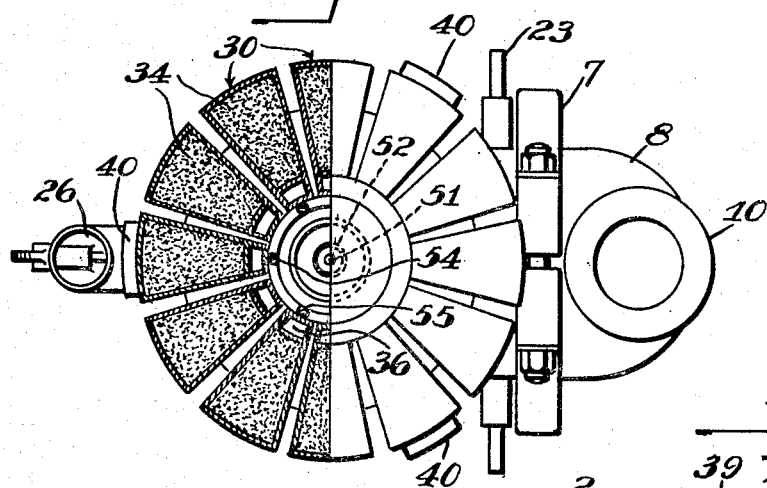
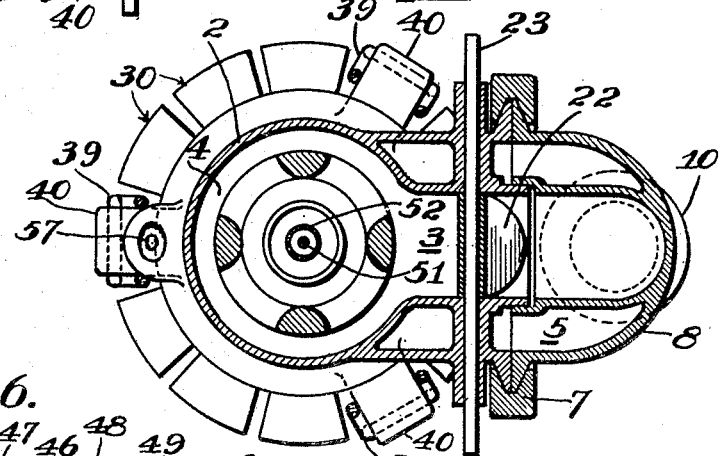
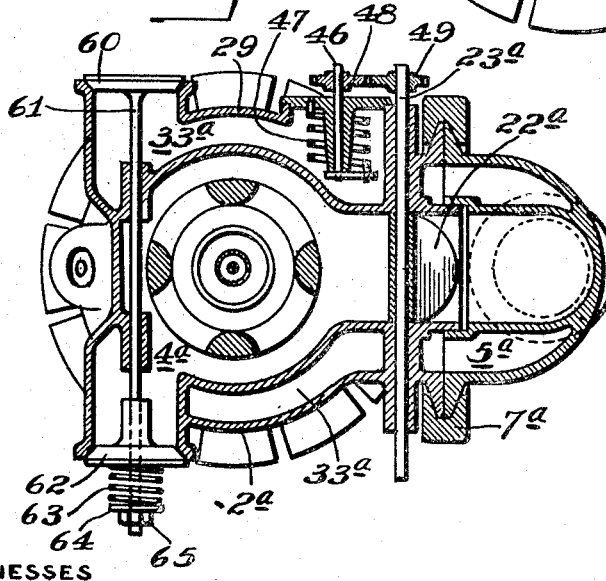

Patented Aug. 30, 1932

1,875,024

UNITED STATES PATENT OFFICE

CONSTANT J. KRYZANOWSKY, OF BALTIMORE, MARYLAND, ASSIGNOR TO MINE SAFETY APPLIANCES COMPANY, OF PITTSBURGH, PENNSYLVANIA, A CORPORATION OF PENNSYLVANIA, AND H. J. NEWMARK, OF NEW YORK, N. Y.

APPARATUS FOR TREATING EXHAUST GASES OF INTERNAL COMBUSTION ENGINES

Application filed January 11, 1929. Serial No. 331,866.

This invention relates to apparatus for purifying exhaust gas of combustion by elimination of objectionable constituents, and it has to do especially with apparatus for treating exhaust gas from internal combustion engines to catalytically convert the toxic and malodorous constituents of the gas into innocuous and odorless compounds.

Gaseous products of combustion generally contain varying amounts of carbon monoxide, and are responsible for numerous cases of poisoning, with frequent fatalities. Carbon monoxide, or gases containing this substance, are particularly dangerous, not only because of its highly toxic character, but also because of its insidious nature, since it gives no warning of its presence. That is, carbon monoxide has no odor, taste or color, it produces no startling effects to warn one breathing it, and large amounts can be taken up by the blood without any other symptom than a feeling of drowsiness. One of the most common sources of carbon monoxide poisoning is from internal combustion engine exhaust gas, which is commonly quite rich in this gas. These instances usually arise from undetected leakage of industrially used gas engines, or of automobile exhaust into closed cars, and often from running automobile engines in a closed garage. Such poisoning may be due to ignorance of the danger, or inadvertence, or even sheer carelessness. Automobile and similar exhaust gases are also objectionable because they usually carry unburned fuel and oil vapors, together with products of combustion and decomposition of those materials, and so are of disagreeable odor.

An object of the invention is to provide efficient and simple apparatus for catalytically rendering gaseous products of combustion non-toxic and odorless, and which is adapted to be readily applicable to any type of internal combustion engine.

Another object is to provide apparatus for use with automobile engines which is capable of catalytically converting carbon monoxide and other oxidizable constituents of exhaust gas and crank case vapors into harmless and unobjectionable compounds, which is fully automatic in its operation, may be installed on existing engines, and in which the catalyst is removably carried so as to be readily replaceable if and when it ceases to be active.

A further object is to provide a light, compact apparatus for catalytically oxidizing objectionable constituents of exhaust gas, in which the air necessary for oxidation is automatically introduced in the proper amount by the action of the gas, and in which automatic control of the catalyst temperature is provided.

The invention is illustrated in the accompanying drawings, in which Fig. 1 is a vertical sectional view through one form of apparatus embodying the invention; Fig. 2 a horizontal section taken on line II—II, Fig. 1; Fig. 3 a horizontal section and partial bottom plan view on the broken line III—III, Fig. 1; Fig. 4 an enlarged view of the air valve control means shown in Fig. 1, together with modifications in construction thereof; Fig. 5 a partial side elevation of Fig. 1 showing means for controlling the exhaust gas; and Fig. 6 a horizontal section similar to Fig. 2 of a modified form of apparatus showing another type of gas control.

As used herein and in the claims with reference to exhaust gas, the term "purification" refers to the elimination of objectionable constituents of the gas, and especially to catalytic oxidation of carbon monoxide and other oxidizable toxic and malodorous substances.

Although not limited in its application thereto, the apparatus is particularly suited for use with automotive vehicles, and will be described in its application thereto.

Having reference now to the illustrative embodiment shown in the drawings, the device comprises a nozzle-carrying upper body portion 1 which seats on a central body member 2 having a laterally extending raw gas intake 3 connected to a gas passage 4 surrounding the lower portion of member 1, and having an outlet 5 for purified gases discharged from a canister 6 removably connected to the body assembly in a manner more fully described hereinafter. The intake 3 is connected by means of a split ring 7 to a T-type fitting 8 having separate gas inlet and outlet passages registering with those of the body member, and connected, respectively, to the exhaust manifold or pipe 9 of an engine, and to a pipe 10 leading to any desired point. This split ring connection allows the device to be rotated bodily on the axis and in the plane of the ring at any desired angle, so as to be suitably disposed in the space available.

Upper body member 1 is provided with an air inlet 11, to which there is connected an air filter of any desired type, that shown comprising a layer of filter cloth 12 stretched on a skeleton framework 13 connected to a central spider 14 having spaced legs 14a between which air passes to inlet 11. An outer vaned casing 15 which protects the filter cloth from mechanical injury.

Air must be mixed with the gas for oxidation of the carbon monoxide and other oxidizable constituents, and although this may be accomplished by means of air supplied from a fan, compressor, or other blowing means, it is preferred, as mentioned previously, to use aspirating nozzles. A single nozzle may be used, but because such nozzles are not usually efficient over a wide range of gas velocities, an insufficient amount of air might be introduced under some operating conditions. For this reason it is preferred to use two nozzles, or sets of nozzles, one for actuation by gas discharged when the engine is operating at high velocity under load, and the other for use when the engine is idling or under light load. For brevity of reference, these nozzles are hereinafter referred to respectively as "high velocity nozzle" and "low velocity nozzle", these terms designating their applicability under conditions of engine operation.

This is preferably accomplished in the manner shown in Fig. 1. A by-pass 15a formed in upper body member 1 connects gas inlet 3 with a set of low-velocity nozzles 16 carried by the body member in an air passage 17 leading from air inlet 11 to a nozzle 18, also carried by the body member, which acts as an entraining chamber for nozzles 16. Disposed below nozzle 18 are three high-velocity nozzles 19, 20 and 21 carried in a nozzle supporting member 2a mounted in body member 2. When the volume of the exhaust gas is too small to entrain air properly by the multistage high velocity nozzles, only the low-velocity nozzles are in action. For this purpose a butterfly valve 22 carried by a shaft 23 in gas inlet 3 diverts all of the gas into passage 15a when the valve is in the position shown in Fig. 1. When the engine is operated under load the volume of the gas is increased and the valve is moved to horizontal position, part of the gas then passing to each set of nozzles.

For passing the crank case vapors into the apparatus nozzle 18 is provided with entraining orifices 24 which lead from an annular channel 25 in the upper body member, the channel being connected to the crank case vent pipe by an inlet 26. Nozzle 18 is firmly held against a seat 27 formed in body member 1, by a coiled spring 28 disposed in an outer sleeve 29 which surrounds the nozzle. In the event of delayed explosion, or backfire, in inlet 3, the nozzle is forced upwardly by the explosion wave, and sleeve 29 closes channel 25 to prevent the pressure wave from passing through the crank case vent connection.

The amount of heat liberated in oxidation of such exhaust gas is such that the catalyst may be damaged by overheating unless means are provided for limiting its temperature. It is preferred to accomplish this by disposing the catalyst so as to present a large radiating area, in order that sufficient heat will be radiated to prevent its overheating. To this end the canister is formed to provide a plurality of catalyst chambers 30 (Fig. 3) radially disposed about a central tube 31. Tube 31 forms a conduit for conveying raw gases and air to the catalyst chambers. At their lower ends these chambers communicate with the bottom of the tube through passages 32, and their upper ends open into an annular passage 33 leading to the purified gas outlet 5. An oxidizing catalyst 34 is disposed in these chambers, screens 35 being arranged at the inlet and outlet passages to retain the catalyst. As shown at 36, Fig. 1, the portion of the tube extending along chambers 30 is preferably double walled to minimize conduction of heat from one member to the other.

The upper end of tube 31 passes through a packing ring 37, and the outer shell of the chambers seats against a gasket in a shoulder 38 formed on body member 2. The canister is attached to the apparatus by means of pressure-applying clamping members, preferably stirrups 39 pivotally carried by the air filter casing which engage lugs 40 provided on the canister, and which are drawn up by toggle action clamps 41. In this manner all parts are firmly held together and the canister is quickly and easily removable without interference with the body or its connection to the engine.

Automatic control of the amount of air supplied to the catalyst, to provide sufficient air for oxidation and to control the catalyst temperature, is achieved in part by the nozzles, which insure sufficient air under all conditions of operation, and in part by regulating the admission of air to the nozzles. The nozzles are rendered effective to this end in response to the operation of the motor discharging the raw gas, and this may be accomplished mechanically by coordination of engine control and gas flow in the body of the apparatus, or thermostatically by conditions in the apparatus itself.

One means of mechanical control of air is shown in Fig. 5, in which shaft 23 of butterfly valve 22 is connected by a lever 42, rod 43 and pivoted lever 44 to a throttle control rod 45. In the thermostatic control of the valve, the means shown in the modified apparatus of Fig. 6 may be used. This comprises a shaft 46 rotatably mounted in gas outlet 33a, about which is spirally wound a band 47 of metal having a high coefficient of expansion. One end of the band is connected to the shaft inside of the body, and the other end is anchored to body member 2a. Expansion and contraction of this band apply torque to the shaft, and the rotative stress thus created is transmitted to valve shaft 23a by segmental gears 48 and 49 mounted on shafts 46 and 23a, to open or close valve 22a as the case may be. This nozzle actuation affords one means of regulating the air necessary for oxidation of the raw gas.

The catalysts suitable for the purposes of the invention are most efficient at elevated temperatures, and it is usually desirable to heat them to initiate reaction. Because of the exothermic nature of these reactions only a small portion of the catalyst need be heated to operating temperature, and reaction will then liberate sufficient heat to heat the balance of the catalyst. It is preferred to heat the catalyst by direct contact with uncooled exhaust gases, and according to this invention this is accomplished by reducing or cutting off the supply of air when the engine is first started, so that the hot gases pass directly to the catalyst, heating the portion adjacent the inlet to operating temperature. In the preferred embodiment the air inlet is provided with a thermostatically controlled valve which is automatically closed when the catalyst is below operating temperature, and which opens to admit the air necessary for oxidation when the catalyst is at proper temperature.

One form of such a valve is shown in Figs. 1 and 4 as comprising a valve head 50 adapted to move toward or into air inlet 11 to reduce or cut off the air flow, and carried by a stem 51 disposed within and anchored at its opposite end to a tubular member 52 which extends downwardly through the nozzles and canister tube to the passages 32 leading to the catalyst chambers. The lower end of stem 51 may be anchored directly to tubular member 52, as shown in Fig. 1, or it may be connected to member 52 through a thermally expanding spiral member 52a in the manner shown in Fig. 4, this latter construction magnifying the movement of the valve head. The upper end of tube 52 is connected to the plate carrying nozzles 16, and its lower end is slidably disposed in a guide yoke 53 attached to the bottom of the canister. The valve rod is preferably made from a metal having a relatively low coefficient of expansion, and the sheath from a metal whose coefficient is high. When the tube is heated by incoming raw gas, its expansion carries the rod and valve downwardly, opening the air inlet, and when it cools, the valve moves in the reverse direction. It is preferred also to arrange this mechanism so that the valve will close the air inlet after the engine is shut off.

Further nozzle control to cause entrainment of the proper amount of air may be, and preferably is, obtained by adapting the high-velocity nozzles to automatically compensate for efficiency losses due to the back pressure in the nozzles caused by increase in volume of gas delivered by the engine within the effective range of these nozzles. This may be accomplished by making one of the nozzles, 21 for example, movable with respect to the others. Thus, in the form shown, when the gas volume increases, the temperature of the gas in tube 31 is increased and nozzle 21 is moved to increase the orifice by the resulting thermal expansion of rods 54 and 55 longitudinally disposed in tube 31, which are connected at their lower end to a ring 56 slidably disposed in the lower end of the tube, and alternately connected at their upper ends to nozzle 21 and body member 2a.

The apparatus may be provided with indicating means for showing the condition of the catalyst. For example, a well 57a may be formed in body 2, to receive a thermometer 57 or other indicating means.

This invention is not directed toward the use of any particular catalyst. There are a number of oxidizing catalysts for use in converting carbon monoxide to dioxide, or for oxidizing hydrocarbon gases, which are well known. Because of the high content of water vapor in internal combustion engine exhaust gas the catalyst must be maintained during use above the boiling point of water, to prevent condensation of moisture on it. Also, the large amount of oxidizable hydrocarbons and carbon monoxide in such gas makes necessary the use of a highly active catalyst, which is capable of efficiently operating at the high temperatures generated by the reactions. These restrictions are such that the known catalysts referred to may not all be suitable for this application. However, although the catalyst forms no part of this invention, nickel or cobalt oxides, manganese dioxide, or ferric oxide, when in catalytically active condition, are suitable for use under these conditions. In order to present as large a gas-catalyst contact surface as possible, it is preferred to support the catalyst on a carrier, such as pumice or asbestos. It is desirable to retard the flow of the gas through the catalyst, in order to prolong its contact therewith, but of course the manner of disposing this material should be such that the increase in resistance to gas flow does not interfere with efficient operation of the engine.

In the operation of the apparatus with a suitable catalyst it is desirable to so operate as to prevent condensation of the water on the catalyst, and this is accomplished in part by connecting the apparatus as close to the engine as practicable, and by operating with the catalyst at a temperature such that condensation will not take place. Of course, some water vapor will condense from the residual gas left in the chambers when the engine is shut off, and for this reason the catalyst must be heated to drive off the condensed moisture and to bring it up to operating temperature when the engine is started. These and other factors are provided for by the automatic control described.

Assuming the engine to have been shut off, valve 50 will close air inlet 11. When the engine is first started, gas passage 3 is closed by valve 22 and all of the raw gas passes to by-pass 15a and nozzles 16, and thence through nozzle 18 and tube 31 to the catalyst chambers. Valve 50 being closed at this time, no air is entrained by the gas so that all of its heat is available for warming up the apparatus. The hot, raw gas at first gives up its heat to the cold metal structure and to the portion of the catalyst adjacent the inlet to the chambers, causing evaporation of moisture from the catalyst. When the cooling effect of the metal structure and catalyst has been reduced to a point where gas at fairly high temperature reaches the catalyst, it has been dried and heated sufficiently so that it commences to oxidize the carbon monoxide or other oxidizable substances, and a large amount of heat is evolved, which is carried to the remaining portions of the catalyst, so that it is quickly effective for its purpose.

When the catalyst reaches operating temperature the heat of the raw gas passing through the lower end of tube 31 is sufficient to cause tubular member 52 to expand, and because it can move only downwardly under this action, valve 50 is depressed, admitting air to the apparatus. This action is designed to occur as soon as a portion of the catalyst is hot enough to carry on its catalyzing action. In this connection it will be understood that the admission of air sufficiently cools the gas that it is not hot enough to bring the catalyst up to operating temperature, and that for this reason the air is at first cut off. This heating action takes place regardless of the position of butterfly valve 22, as long as valve 50 is closed.

When the operation of the engine causes the raw gas to be exhausted in a volume in excess of that necessary to function properly with the low-velocity nozzles, valve 22 automatically opens and distributes the gas between the two sets of nozzles. In the case of mechanical actuation, this is accomplished coincidentally with opening of the engine throttle; and where the thermo-responsive means described is employed, valve 22 remains closed as long as the total heat of the gas entering passage 33a is insufficient to open the valve. Upon the admission of gas in a volume sufficient to cause the temperature of the effluent gas to increase to the point where coiled band 47 is expanded, valve 22a is opened. Further heating causes rods 54 and 55 to expand and open the orifice of nozzle 21, so as to maintain the proper air flow.

The large radiating area of the catalyst chambers dissipates a portion of the reaction heat, and this together with regulated cooling of the gas by control of the air supply prevents overheating of the catalyst with consequent impairment of its activity. When the load on the motor is reduced, or when it is idling, the butterfly valve is closed automatically and nozzles 16 again are exclusively in action. If for any reason the catalyst falls below operating temperature, tube 52 contracts reducing the admission of air until the catalyst is again operating properly. Also, valve 50 closes when the engine is shut off, preventing access of moisture from the air and placing the apparatus in condition for heating when the engine is again started.

The various control means described in effect regulate the air supply in response to the temperature of the catalyst. For example, valve 50 opens and closes the air inlet according to the temperature of the raw gas, and this is in effect in response to catalyst temperature, because when the catalyst is cold, or falls below operating temperature the valve is closed. The tube of this member being disposed adjacent the inlet to the catalyst chambers, and being in contact with yoke 53 which is in metallic contact with the catalyst chambers, is thus substantially at the temperature of the catalyst adjacent thereto, and is so referred to in the claims, a thermo-responsive element embedded in the catalyst at that point being equally applicable. Also, thermal control of valve 22a is governed by the catalyst temperature, the means being actuated by the heat of gas discharged from the catalyst chambers.

When the catalyst is operating, any carbon monoxide in the gas is oxidized to the non-toxic carbon dioxide. Also, other oxidizable constituents of the gas are simultaneously acted upon by the catalyst. For example, malodorous products resulting from thermal decomposition of oil and fuel, and other hydrocarbon constituents are oxidized by the catalyst, or otherwise totally converted into practically odorless products. In consequence, the purified gas passed from the apparatus is not toxic in nature and is practically without the disagreeable smell which usually characterizes internal combustion engine exhaust.

When the crank case vapors are vented into the apparatus, the danger of backfire being communicated to the crank case is obviated in the manner described. Any tendency toward rupture of the apparatus by explosive combustion therein may be overcome by the incorporation of other safety means, one type being shown in the modified form represented in Fig. 6. A valve 60 integral with a stem 61 seats in an aperture in the outer wall of gas outlet 33a. This shaft extends through an aperture in gas inlet 4a on the opposite side of the apparatus, which aperture is closed by a valve head 62 which floats on stem 61. A spring 63 bearing against head 62 and a washer 64 held in place by a nut 65 applies equal pressure to each valve. In case of backfire in the gas inlet, head 62 moves outwardly on stem 61, relieving excess pressure in the inlet; and in the event of explosion in the outlet, valve 60 moves outwardly, the stem moving through head 62.

Other means of heating the catalyst than that described herein, and modifications in construction of the apparatus are shown and described in two copending applications, Serial Numbers 331,867 and 331,868 filed by me of even date herewith.

According to the provisions of the patent statutes, I have explained the principle and operation of my invention and have illustrated and described what I now consider to represent its best embodiment. However, I desire to have it understood that, within the scope of the appended claims, the invention may be practiced otherwise than as specifically illustrated and described.

I claim:

1. Apparatus for catalytically purifying exhaust gas, comprising a canister provided with an inlet for raw gas and an outlet for purified gas, an oxidizing catalyst disposed in said canister in the path of said gas, a multi-stage aspirating nozzle associated with the inlet for entraining air upon passage of said raw gas through the nozzle, and thermo-responsive means associated with one stage of the nozzle to vary its entraining aperture in response to changes in the temperature of the raw gas.

2. Apparatus for catalytically purifying exhaust gas, comprising a canister provided with an inlet for raw gas and an outlet for purified gas, an oxidizing catalyst disposed in said canister in the path of said gas, and thermo-responsive means associated with said inlet for supplying uncooled raw gas to the catalyst when the catalyst is below operating temperature.

3. Apparatus for catalytically purifying internal combustion engine exhaust gas comprising a canister provided with an inlet for raw gas and an outlet for purified gas, an oxidizing catalyst disposed in said canister in the path of said gas, means for admixing air in a continuous stream with said gas, and thermo-responsive means associated with the catalyst for reducing the supply of air when the catalyst is below operating temperature.

4. Apparatus for catalytically purifying internal combustion engine exhaust gas, comprising a canister provided with a gas inlet, an oxidizing catalyst disposed in said canister in the path of said gas, means for admixing air with said gas prior to contact with the catalyst, and means responsive to the catalyst temperature for varying the amount of air admitted.

5. Apparatus for catalytically purifying internal combustion engine exhaust gas, comprising a canister provided with a gas inlet, an oxidizing catalyst disposed in said canister in the path of said gas, a multi-stage aspirating nozzle associated with said inlet for entraining air by passage of the gas through the nozzle, and thermo-responsive means disposed in the path of said gases and effective when the catalyst is below operating temperature for automatically reducing the air admitted.

6. Apparatus for catalytically purifying internal combustion engine exhaust gas, comprising a canister provided with an inlet for raw gas and an outlet for purified gas, an oxidizing catalyst disposed in said canister in the path of said gas, a multi-stage aspirating nozzle associated with said inlet for entraining air by high-velocity gas, and a separate nozzle for entraining air by low-velocity gas.

7. Apparatus for catalytically purifying internal combustion engine exhaust gas, comprising a canister provided with an inlet for raw gas and an outlet for purified gas, an oxidizing catalyst disposed in said canister in the path of said gas, a multi-stage aspirating nozzle associated with said inlet for entraining air by high-velocity gas, a separate nozzle for entraining air by low-velocity gas, means for rendering said low velocity nozzle solely effective when the gas is of low-velocity, and thermo-responsive means disposed in the path of said gases and effective when the catalyst is below operating temperature for reducing the air admitted.

8. Apparatus for catalytically purifying internal combustion engine exhaust gas, comprising a body portion having a raw gas intake for connection to an engine exhaust, a multi-stage aspirating nozzle disposed in said intake for entraining air by passage of high-velocity gas, a separate nozzle in said intake for entraining air by low-velocity gas, a canister removably connected to said body, an oxidizing catalyst disposed in said canister in the path of said gas, means for rendering said nozzles effective in response to operation of the engine, and thermo-responsive means associated with the catalyst for reducing the air supply when the catalyst is below operating temperature.

9. Apparatus for catalytically purifying internal combustion engine exhaust gas, comprising a body portion having a raw gas intake for connection to an engine exhaust, a multi-stage aspirating nozzle disposed in said intake for entraining air by passage of high-velocity gas, a separate nozzle in said intake for entraining air by low velocity gas, a canister removably connected to said body, an oxidizing catalyst disposed in said canister in the path of said gas, thermo-responsive means associated with the raw gas intake for automatically rendering the low-velocity nozzle solely effective when the engine idles, and thermo-responsive means for reducing the air admitted when the catalyst is below operating temperature.

10. Apparatus for catalytically purifying exhaust gases, comprising a canister provided with an inlet for raw gas and an outlet for purified gas, an oxidizing catalyst disposed in said canister in the path of said gas, and thermo-responsive means automatically controlled by the temperature of the raw gas for heating a portion of the catalyst to and maintaining it at operating temperature while raw gas is supplied to the catalyst.

In testimony whereof, I sign my name.

CONSTANT J. KRYZANOWSKY.